June 6, 1967 G. ELSBACH 3,323,737

PNEUMATIC TAPE DRIVE SYSTEMS

Filed Feb. 24, 1965

INVENTOR.
GERALD ELSBACH
BY Robert G. Clay
ATTORNEYS

United States Patent Office 3,323,737

Patented June 6, 1967

3,323,737

PNEUMATIC TAPE DRIVE SYSTEMS

Gerald Elsbach, Redwood City, Calif., assignor to Ampex Corporation, Redwood City, Calif., a corporation of California Filed Feb. 24, 1965, Ser. No. 434,979
8 Claims. (Cl. 242—55.12)

This invention relates to pneumatic tape drive systems, and more particularly to improved devices for controlling the tape tension exerted by low inertia tape loops.

Pneumatic tape drive systems of the type described in the concurrently filed United States patent application of George Brettell, Ser. No. 434,770, entitled, "Pneumatic Tape Drive System" and assigned to the assignee of the present invention, are capable of moving a tape or other web material bidirectionally at controlled speeds without the use of mechanical drive elements frictionally engaging the tape surface. Pneumatic tape drive systems as thus disclosed can also be used to correct undesired instantaneous tape speed variations, commonly known as flutter, which are produced by the driving elements in a tape transport.

In these pneumatic tape drive systems, controlled tape movement at high speed is obtained through variation of tension on the loops formed within storage chambers located on opposite sides of the head assembly. Rapid tension changes can be introduced through control of the pressure differential across the tape by one of several methods. Vacuum pressures, for example, can be controlled either through regulation of the air flow by means of valves or through a sudden increase in the volume of the chamber by means of signal operated diaphragms similar to conventional lousdpeaker units, or through a combination of both methods. When the vacuum pressures in the two chambers are varied in opposite senses the resulting differential tape tension causes the tape to be accelerated rapidly past the head assembly. Continuous tape movement is obtained by maintaining a tension differential by the pneumatic means, while also operating the tape storage reels in servo fashion to keep the loops between selected limits within the chambers.

However, the extent of control that can be achieved by varying pressures at the closed ends of the chambers is subject to certain limitations. Achieving a uniform pressure change throughout the closed end of the chamber requires a finite amount of time depending on the chamber volume. Generally the frequency response of a given chamber is inversely related to its loop storage capacity and its speed of response is ultimately limited by the velocity of sound in the air. Unfavorable resonance effects requiring complex acoustic designs may also result when the chamber dimensions approach a quarter wavelength at the operating frequency. In the previous systems, air flow valves provided the constant vacuum level difference needed for continuous tape movement, but were comparatively slow acting by reason of the time required to fill or empty the air in the chamber. A loudspeaker diaphragm arrangement gives faster response, but is unable to maintain continuous vacuum level differences. A combination of the two would permit the best features of both to be utilized for quick initial tape acceleration and later maintaining tension for steady state operation. Nevertheless, such combined arrangements are still subject to the unfavorable resonant effects and time delays inherent in achieving uniform pressure changes.

Accordingly, it is an object of the present invention to provide a pneumatic tape transport system having an improved signal controlled differential pressure chamber for varying the tape tension under both transient and steady state conditions.

Another object of the present invention is to provide an improved vacuum chamber arrangement for controlling the tension applied to a tape loop almost instantaneously in response to an applied signal.

A further object of the present invention is to provide an improved vacuum chamber capable of introducing tension variations without relying on changes in the vacuum level at the closed end of the chamber.

Yet another object of the present invention is to provide an improved differential pressure chamber for use with pneumatic tape transports which start and stop a tape at high accelerations and decelerations and maintain the tape speed substantially constant during steady state operation.

Briefly, these and other objects are accomplished in accordance with the present invention by providing a pair of differential pressure chambers, one on either side of the head assembly of the magnetic tape transport system, having opposite parallel side walls movable with respect to one another to change the transverse dimensions of the tape loop. By this means the tension applied to the tape loop may be varied by control of the chamber width without changing the pressure at the closed end of the chamber. Preferably, one side wall is held stationary while the other is attached for controlled movement with the armature of a signal operated solenoid arrangement, that is actuated by speed error signals. To drive the tape, the side walls of the two chambers are moved in opposite directions with respect to their respective fixed side wall to achieve the tape tension differentials needed for acceleration or deceleration. In addition, at the completion of the side wall movement, the different chamber widths maintain a constant tension differential, and therefore a constant movement of the tape. The degree of tension differential is servo controlled by the speed error signal derived from a clock track on the tape, with tape reel servos being used to maintain selected loop lengths within the chambers.

These and other aspects of the invention may best be understood by reference to the following description, taken in conjunction with the accompanying drawings, in which.

Figures 1, 2, 3:
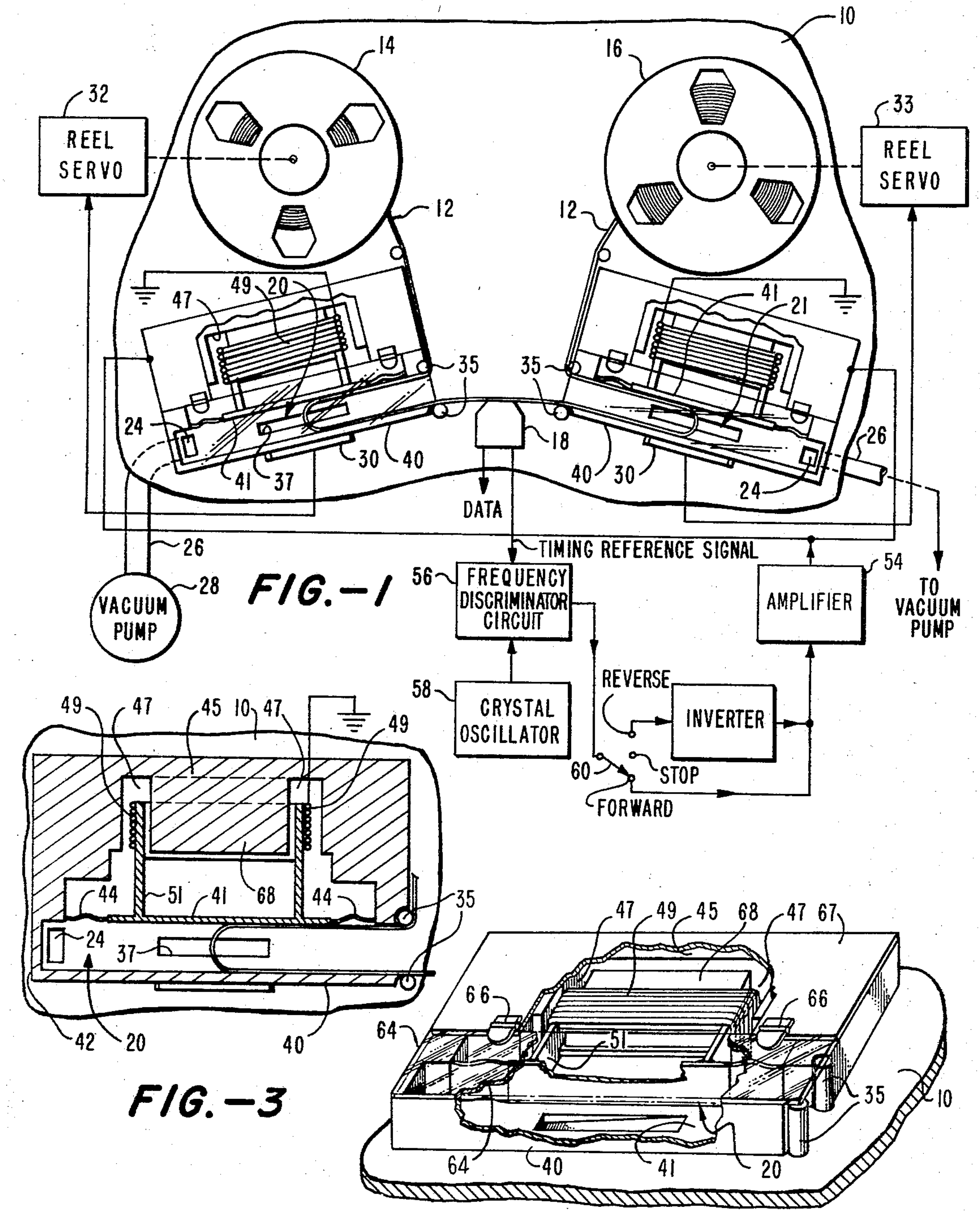
FIGURE 1 is a front simplified view of a pneumatic tape drive system in accordance with the invention, with the control circuitry shown in block diagram form.
FIGURE 2 is a perspective view of an improved vacuum chamber in accordance with the invention, partially cut away to show interior details; and, FIGURE 3 is a detailed side sectional view showing an improved differential pressure chamber arrangement in accordance with the invention.

While this invention will be described with relation to a simplified pneumatic tape transport arrangement, it should be understood that the variable width differential pressure chambers in accordance with this invention are generally applicable to improve the response speed of each of the pneumatic tape transport arrangements shown in the aforementioned concurrently filed patent application. For example, the variable width chamber of this invention is particularly useful for incremental or step-by-step pneumatic recording systems wherein improved response speeds permit corresponding increases of the density of the data recorded on the tape. It should also be noted that, although specific reference is made to vacuum chambers, other differential pressure arrangements may also be used. For example the inlet (open) end of a chamber may be at a higher level than atmosphere, while the bottom (closed) end is at atmosphere.

Referring now to FIGURE 1, the principal elements of a pneumatic tape transport in accordance with this invention are illustrated in simplified form as mounted on a fragment of a frontal panel 10. The magnetic tape 12 is driven between a tape supply reel 14 and a tape takeup reel 16 past a magnetic recording and reproducing head assembly 18, and low inertia tape loops are formed adjacent either side of the head assembly 18 in a pair of adjustable width vacuum chambers 20 and 21, shown in greater detail in FIGURES 2 and 3. The vacuum chambers 20 and 21 each have a vacuum inlet port 24 coupled through pneumatic conduits 26 to a constant pressure vacuum pump 28. The vacuum chambers 20 and 21 each also include a loop position sensing device 30 for detecting the length of the tape loop within the chamber relative to a desired nominal position. Any conventional tape loop sensing device, such as pressure switches or photoelectric devices, may be employed for this purpose. It is preferred, however, to use a proportional sensor, such as the elongated photoelectric device described in the aforementioned concurrently filed patent application, to generate the loop position signal.

Separate reel servos 32 and 33 including amplifiers and motors (not shown in detail) receive the loop position signals and are coupled to the tape supply and takeup reels 14 and 16, respectively. These reel servos 32 and 33 are conventionally mounted behind the panel 10, but are shown in block diagram form physically displaced from the reels for clarity. Output signals derived from the associated loop position sensing devices 30 operate the respective reel servos 32 or 33 to rotate the supply and takeup reels 14 and 16 so as to tend to maintain the tape loops at selected positions within the chambers 20 and 21. The reel servo motors may in addition have selectively operable braking means (not shown) for stopping the reels rapidly to insure positive reel control when the tape is at the correct nominal position in the chamber after tape movement has stopped. Various other loop positioning arrangements should be understood as being readily available to those skilled in the art for accomplishing these purposes, and accordingly these alternative arrangements will not be described herein in detail.

At the exit end of the chambers 20 and 21 (the exit end of the chamber being herein defined as the side closest to the adjacent reels 14 and 16), the tape 12 passes over conventional low friction tape guides 35 preferably of the air bearing type, in which a thin film of air is forced between the adjacent tape surface and a rounded guide surface to eliminate substantial frictional contact. Thus the tape is substantially free of frictional restraints with the only sliding contact being with the walls of the chambers 20 and 21, the head assembly 18 and the tape guides 35. Note also that the tape path across the head assembly 18 and into the chambers 20 and 21 is virtually straight.

The back walls of the vacuum chambers 20 and 21 can conveniently consist of the underlying portions of the front panel 10. For better loop balance, a longitudinal groove 37 (or slot) is provided in the back wall of each column, the groove 37 being centered on the longitudinal axis substantially midway between the parallel sidewalls. The depth of the groove 37 gradually increases along its longitudinal extent from the open end of the vacuum column toward its closed end. The function of the grooves is more fully explained in the aforementioned concurrently filed patent application. Briefly, however, the groove 37 provides a variable spring effect, by adding a variable width pneumatic coupling between atmosphere and the vaccum source, dependent upon the loop position. Furthermore, this pneumatic coupling increases with loop length, so that the pressure differential across the loop, and therefore the tension, decrease for a given vacuum level and chamber width.

Further details relating to the vacuum chambers 20 and 21 will hereafter be described with reference to FIGURES 2 and 3 which illustrate the principal elements of one of the variable width vacuum chambers used in accordance with the invention. In construction, the two vacuum chambers 20 and 21 are mirror images of one another so that only one need be described in detail. The chamber 20 has a fixed outer sidewall 40 and a transversely movable inner sidewall 41, the fixed outer sidewall 40 being rigidly attached to or integrally formed with a fixed backwall 42. The ends of the movable sidewall 41 are here attached by flexible members 44 to slightly protruding end portions of a solid base member 45 formed of a magnetic material. The protruding end portions of the solid base member 45 extend outward enough to allow the movable sidewall 41 freedom of movement from an initial rest position in both directions toward and away from, but remaining parallel to the sidewall 40. Alternatively, no flexible coupling need be used, but the space between the sidewall 41 and the ends of the base 45 should then be small to avoid a substantial pneumatic leakage path. A pair of slots 47 formed in the solid base member 45 perpend'cular to the plane of the movable sidewall 41 define a central rectangular core member of magnetic material. A solenoid coil 49 is wrapped on a rectangularly shaped coil supporting structure 51 which is fixedly attached to the rear face of the movable sidewall 41 and surrounds the central core member so as to be freely movable in the slots 47 of the solid base member 45. The central core member of the solid base member 45 has a permanent magnetic field polarizing the magnetic material surrounded by the coil 49 along an axis perpendicular to plane of the movable sidewall 41. Accordingly, with an electrical current flowing in the coil 49, the magnetic force generated moves the movable sidewall 41 in one direction or another, depending upon the direction of current flow through the coil 49 relative to the sense of the polarization of the central core section, and by an amount proportional to the magnitude of the current flow, to act against the spring force of the flexible members 44.

Movement of the movable sidewall 41 relative to the fixed sidewall 40 changes the transverse dimension of the tape loop within the chamber 20. Since the total force on the tape loop drawing it into the chamber is equal to the product of the pressure differential across the loop times the total tape area across which this differential pressure is established, the change in the transverse dimensions of the chamber 20 may be seen to produce a change in the tension applied to the loop. This change is substantially directly proportional to the relative increase or decrease in chamber width, even though the vacuum pressure at the outlet port 24 may remain substantially the same.

The solenoid coils 49 are actuated by electrical current signals obtained from the output of a speed servo 54 or other circuit operated in response to tape speed control circuitry like that described in the previously mentioned concurrently filed patent application. The tape 12 is provided with a clock or control track having an oscillatory or pulse reference signal prerecorded at a fixed spacing or wavelength adjacent the data track. For a given tape speed, of course, this signal is reproduced to constitute a fixed repetition rate or frequency. A separate magnetic reproducing head (not separately shown) contained in the magnetic head assembly 18 reproduces the timing reference signals as data signals are being recorded or reproduced by other magnetic heads positioned adjacent respective data tracks on the tape. The reproduced timing reference signals are applied to one input of a frequency discriminator circuit 56 and compared with a fixed frequency from a crystal oscillator 58. Thus the frequency discriminator circuit 56 generates an output error signal that is a function of the frequency difference between the reproduced timing reference signal and the fixed oscillator frequency. The speed error signal is then amplified by an amplifier circuit 54 which is capable of amplifying signals of either polarity applied to the amplifier 54 depends on the setting of the movable contact of a three position control switch 60, which has FORWARD, REVERSE and STOP positions. An inverter circuit 59 reverses the polarity of the error signal from the frequency discriminator circuit 56 when the switch is in the REVERSE position. A conventional electronic gating circuit capable of passing one of three input voltage levels in response to FORWARD, REVERSE and STOP command signals may be used for higher speed switching. For, example, for the STOP command signal, the output of the control circuit 50 may be chosen at ground level, whereas for FORWARD and REVERSE command signals, the output levels are equal in magnitude but opposite in polarity. Control during acceleration and deceleration may be by closed loop or open loop techniques, as desired, but control during steady state operation is achieved by the closed loop system.

The operation of the tape transport system in accordance with the invention can thus be understood by considering a typical operating sequence which begins with the tape 12 initially at rest. Assume now that the switch 60 is set in its FORWARD position to apply a positive potential speed error signal from the amplifier 54 to actuate the solenoid coils 49 of the variable width chambers 20 and 21. The positive signal causes the movable sidewall 41 to move inwardly toward the fixed sidewall 40 in the chamber 20, thereby suddenly decreasing chamber width. Concurrently, at the other chamber 21, the movable sidewall 41 is moved in the opposite direction an equal distance away from the fixed sidewall 40 to increase the chamber width. The changes in the cross-sectional dimensions of the two chambers 20 and 21 decrease and increase, respectively the tensions on the tape loops. Also the chamber volumes below the loops are changed to increase the vacuum level (lower the pressure) in the chamber 21, and decrease the vacuum level in the chamber 20. The sudden tension differential on the loops quickly accelerates the tape past the head assembly 18 by shortening the loop within the chamber 20 and lengthening the loop within the chamber 21. During the first part of this sudden acceleration, the reels 14 and 16 remain substantially stationary and the initial tape movement results from the loop imbalance alone. The shifts in loop lengths are immediately sensed by the loop position sensing devices 30, which then actuate the reel servos 32 and 33 to rotate the supply and takeup reels 14 and 16, respectively. The reel 14 is rotated clockwise to supply additional tape to the chamber 20 in an effort to maintain the loop length at the selected position, whereas the reel 16 is also rotated clockwise to withdraw tape from the chamber 21 to maintain the opposite loop at the selected position. The chamber dimensions are chosen to give adequate loop storage for the desired acceleration rate of the tape and reel servo response.

The tape thereafter continues to move in the forward direction across the head assembly 18 in response to both the differential tension maintained on the loops by the forward command signal and the movement of the takeup reel 16. With the tape in movement, the timing reference signals reproduced from the control track are compared with the fixed frequency in the frequency discriminator circuit 56 to generate the speed error signal. As the reels 14 and 16 accelerate, they eventually will reach nominal tape speed. Then the system runs in steady state with the chambers 20 and 21 operating to supply only that small tension difference needed to overcome the small tape path friction.

In steady state operation also, the chamber widths may be varied to compensate for tape flutter introduced by the tape path and the reel servos. Thus precise speed control, determined by the actual tape speed, may be attained even though high start-stop rates are not needed. On stopping, removal of the speed error signal by moving the switch 60 to the STOP position causes the moveable sidewalls to return to their previous positions thus equalizing the chamber widths and the tensions on the loops. Tape movement between the chambers stops quickly, and the reel servos control the rotation of the reels to restore the loop balance without further tape movement at the head assembly 18.

A tape drive system using variable width chambers 20 and 21 can be seen to have several advantages. First, a change in tape tension on the loops immediately follows a change in chamber width because the tension change is not subject to the time delays inherent in realizing pressure changes in the entire volume at the closed ends of the chambers. Furthermore, it is obvious that sudden movement of the sidewall 41 also suddenly increases or decreases the chamber volume to produce a momentary pressure variation tending to aid the acceleration or deceleration of the tape. Thus, acceleration or deceleration begins as soon as the movable sidewall 41 is moved, increases to a maximum at a slightly later time in the acceleration interval as a result of the momentary pressure change, and then dissipates as the tape reaches nominal speed. Of course, this dual effect obtains in the opposite sense when the tape is being decelerated.

Furthermore, the movable sidewall may be held at any transverse position to establish a cross-sectional tape area which gives the needed tension differential for steady state operation. The tension differential need only overcome frictional and other resistive forces, and in fact varies continuously to reduce flutter.

It will be understood by those skilled in the art that the limiting factor in the speed of tape acceleration by this system will be the inertia of the movable elements plus any frictional forces opposing their movement. Accordingly, the coil 49, the movable sidewall 41, the flexible attachments 44, and the coil support structure 51 should be carefully constructed of low-friction lightweight materials to eliminate any unnecessary inertia or friction. For example, the movable sidewall 41 and the coil support structure 51 may be constructed of thin but rigid polypropylene plastic or the like.

As shown in FIGURES 2 and 3 the top walls 64 of the vacuum chambers 20 and 21 may be a smooth plate of transparent plastic or glass to permit visual inspection of the interior of the chambers even during operation. The top walls 64 and the back wall cover the chambers 20 and 21 to the extent of their maximum width and should give a close fit, but low friction contact, with the upper and lower surfaces of the movable sidewalls 41 and the flexible members 44 so as to prevent excessive air leakage. A slight air leakage around the movable sidewall 41 is nevertheless desirable to rebalance air pressures on opposite sides after a sudden movement in order to eliminate an undesirable position bias due to the previous position. The transparent top wall 64 may be attached by hinges 66 to a top plate 67 to permit easy access to the interior of the chambers 20 and 21 for tape threading, chamber cleaning or rectifying possible tape loop malfunctions. The front panel 10 and the top plate 67 attached to the base member 45 seal the air volume behind the moveable sidewall 41. The central core section 68 of the base member 45 has a smaller transverse dimension or thickness than the base member 45 and is centrally located thereon to provide clearance between the core 68 and the plates 10 and 67 to permit free movement of the coil 49 and support structure 51 toward and away from the chamber 20.

As previously mentioned, these variable width vacuum chambers in accordance with the invention are particularly useful in improving the operating characteristics of intermittent or step-by-step pneumatic tape transports by increasing the obtainable data density on the tape. For this purpose, an additional vacuum chamber of constant or variable tension, depending upon whether continuous operation is also desired, may be included between each of the tape storage reels 14 and 16 and their respective variable width chambers 20 and 21 which are adjacent the recording head assembly 18. A tape braking device, which may consist of a pneumatic brake actuated at the termination of a short duration command signal, may be attached to a perforated section of the fixed sidewall 40 adjacent the open end of the chamber 20 or 21, as disclosed in the previously mentioned concurrently filed patent application. Such a tape braking device is used only if needed to prevent backward movement of the tape after an incremental forward movement. However, a tape braking device normally will not be needed for an incremental system using these variable width vacuum chambers. Since the accelerating loop tension differentials primarily result from changes in the chamber width rather than pressure changes, the return of the movable sidewalls 41 to their original position following an incremental movement does not produce a tension differential in the opposite direction to cause a reverse movement. The relatively small instantaneous pressure change resulting from a slight volume variation upon movement of the wall must be taken into consideration, but usually has negligible effect in moving the tape backward relative to the total incremental distance travelled in the forward direction. Therefore, variable width vacuum chambers in accordance with the invention may be used to advantage in incremental recorders as shown herein almost without substantial change.

Such variable width vacuum chambers may also be used for correcting instantaneous tape speed variations in conventional capstan driven tape transports. As explained in the aforementioned concurrently filed patent application, small capacity vacuum chambers capable of exerting differential tension variations on the tape loops formed therein in response to a control signal may be located adjacent opposite sides of the head assembly. A tape speed control circuit generates a speed-error signal indicative of the instantaneous tape speed variations for varying the width of the vacuum chambers. With proper phasing of the control signal, the loop lengths in the chambers may be varied to counteract instantaneous tape speed variations across the head. By using the variable width chambers of the present invention instead of the variable pressure chambers described in the concurrently filed application, the speed with which the correction may be achieved is increased and acoustic resonance problems are substantially avoided. This permits use of smaller chambers and simplified proper phasing of the control signal.

Although a particular form of improved pneumatic tape transport system using variable width chambers for control of the tape has been described herein by way of example to illustrate the nature of the invention, it will be appreciated that the invention is not limited thereto. Accordingly, the invention should be considered to include all alternative forms, modifications and variations and detail falling within the scope of the appended claims.

What is claimed is:

1. A drive system for advancing a web material between supply and takeup reels in a controlled path past an operating assembly comprising first and second variable width vacuum chambers for forming low inertia web material loops adjacent opposite sides of the operating assembly, each variable width vacuum chamber having a pair of substantially parallel side walls with at least one of said walls being movable with respect to the other to vary the chamber width, means for generating an actuating signal indicative of tape speed, means responsive to said actuating signal for varying the widths of the first and second variable width vacuum chambers in opposite directions to produce a tension differential between the low inertia loops for advancing the web material at a controlled speed past the operating assembly, and vacuum source means coupled to the chambers for maintaining substantially constant nominal pressure differentials across the loops.

2. The drive system of claim 1 wherein the tape path between the first and second chambers is characterized by low friction and further including first and second loop position sensing means for producing signals indicative of the loop positions within the first and second variable width vacuum chambers, and servo means responsive to signals indicative of the loop positions for operating the supply and take-up reels to maintain the loops at desired lengths within the first and second variable width vacuum chambers.

3. A pneumatic drive system for moving a web material past an operating device comprising a pair of differential pressure chambers, each positioned on a different side of the operating device and each forming a loop in the web material, said chambers each including side walls defining the transverse dimension of the loops, means for generating an actuating signal indicative of tape speed, and means responsive to said actuating signal coupled to move the side walls of the chambers for varying the tensions on the loops differentially.

4. A pneumatic drive system for advancing a web material in a controlled path past an operating assembly comprising means for generating an actuating signal indicative of tape speed, first and second differential pressure chambers for forming low inertia web material loops on either side of the operating assembly, said first and second differential pressure chambers having substantially parallel side walls movable with respect to one another for varying the tension on the loops in response to said actuating signal, and means responsive to the lengths of the loops within the chambers for maintaining the loops at desired lengths within the first and second chambers.

5. A pneumatic drive system for moving a web material past an operating device comprising a pair of differential pressure chambers, each positioned on a different side of the operating device along the path of the web material, and each including an open end for receiving the web material and an enclosed end, and side walls of a width substantially equal to the width of the web material, such that a differential pressure between the open end and the closed end forms a loop in the web material, the spacing between the side walls determining the transverse dimension of the loop in the plane thereof, at least one of the side walls of each chamber being movable toward and away from the other wall, means for generating an actuating signal indicative of tape speed, and means coupled to the movable sidewalls for oppositely varying the transverse dimensions of the chambers in the planes of said loops in response to said actuating signal.

6. A pneumatic tape transport system for advancing the tape in a controlled fashion past an operating assembly between tape storage reels comprising means for generating an actuating signal indicative of tape speed, first and second variable width vacuum chambers for forming a low inertia tape loop on each side of the operating assembly, said first and second variable width vacuum chambers including means responsive to said actuating signal for controlling the chamber widths to regulate the tension on the tape loops, and servo means for operating the tape storage reels to maintain substantially constant tape loop lengths in the first and second variable width chambers.

7. A digital data tape transport system comprising a magnetic recording and reproducing head assembly, tape storage means, vacuum chamber means for forming low inertia tape loops in the tape path adjacent opposite sides of the magnetic head assembly, said vacuum chamber means having substantially parallel side walls defining the transverse dimensions of the loops in the planes thereof and means for maintaining a substantially constant vacuum pressure at the closed end of the chamber means, means generating control signals indicative of tape speed, and actuating means responsive to said control signals for varying the transverse dimensions of said vacuum chamber means in opposite senses to produce a tensioning differential between the low inertia tape loops for moving the tape past the magnetic head assembly.

8. A digital tape transport system comprising a magnetic recording and reproducing head assembly, tape supply and take-up reels on opposite sides of the head assembly, first and second vacuum chambers for forming low inertia tape loops in the tape path between the reels adjacent opposite sides of the magnetic head assembly, each of said vacuum chambers having an open end for receiving the tape loop, and a substantially closed end, the open end being open to atmosphere, each of said vacuum chambers also having substantially parallel side walls defining the transverse dimensions of the loop, one of said side walls of each chamber being movable with respect to the other to vary the transverse dimension of the vacuum chamber the tape path between the chambers and across the head assembly being characterized by low friction, the back wall of each vacuum chamber including a variable depth bypass groove extending longitudinally along the chamber, for varying the pressure differential across the loop in accordance with its length, a vacuum source for maintaining a vacuum pressure at the closed end of each chamber, solenoid actuating means attached to each movable side wall of each chamber for controlling the transverse dimensions of the two chambers in opposite senses in response to control signals, tape loop position sensing means responsive to the length of the tape loop in each vacuum chamber relative to a selected loop position for generating loop position error signals, reel servo means responsive to the loop position error signals from the loop position sensing means of the associated vacuum chamber for operating the tape supply and take-up reels to maintain the tape loops substantially at the selected positions within each of the chambers, tape speed sensing means for generating a speed error signal indicative of the difference between actual tape speed and a desired norminal tape speed, and speed servo means responsive to the speed error signal for generating the control signal supplied to the solenoid actuating means to vary the vacuum chamber transverse dimensions and thereby control the tension differential between the low inertia tape loops so that the tape is moved past the magnetic head assembly at the desired speed.

References Cited

UNITED STATES PATENTS

| | | | |
|---|---|---|---|
| 2,727,097 | 12/1955 | Frayne ___________ | 179—100.2 |
| 2,921,753 | 1/1960 | Lahti et al. ________ | 242—55.12 |
| 3,074,661 | 1/1963 | Brumbaugh et al. ___ | 242—55.12 |
| 3,156,423 | 11/1964 | Potter et al. ________ | 242–55.12 |
| 3,187,971 | 6/1965 | Miller et al. __________ | 226—95 |

STANLEY N. GILREATH, *Primary Examiner.*

GEORGE F. MAUTZ, FRANK J. COHEN, *Examiners.*